United States Patent Office.

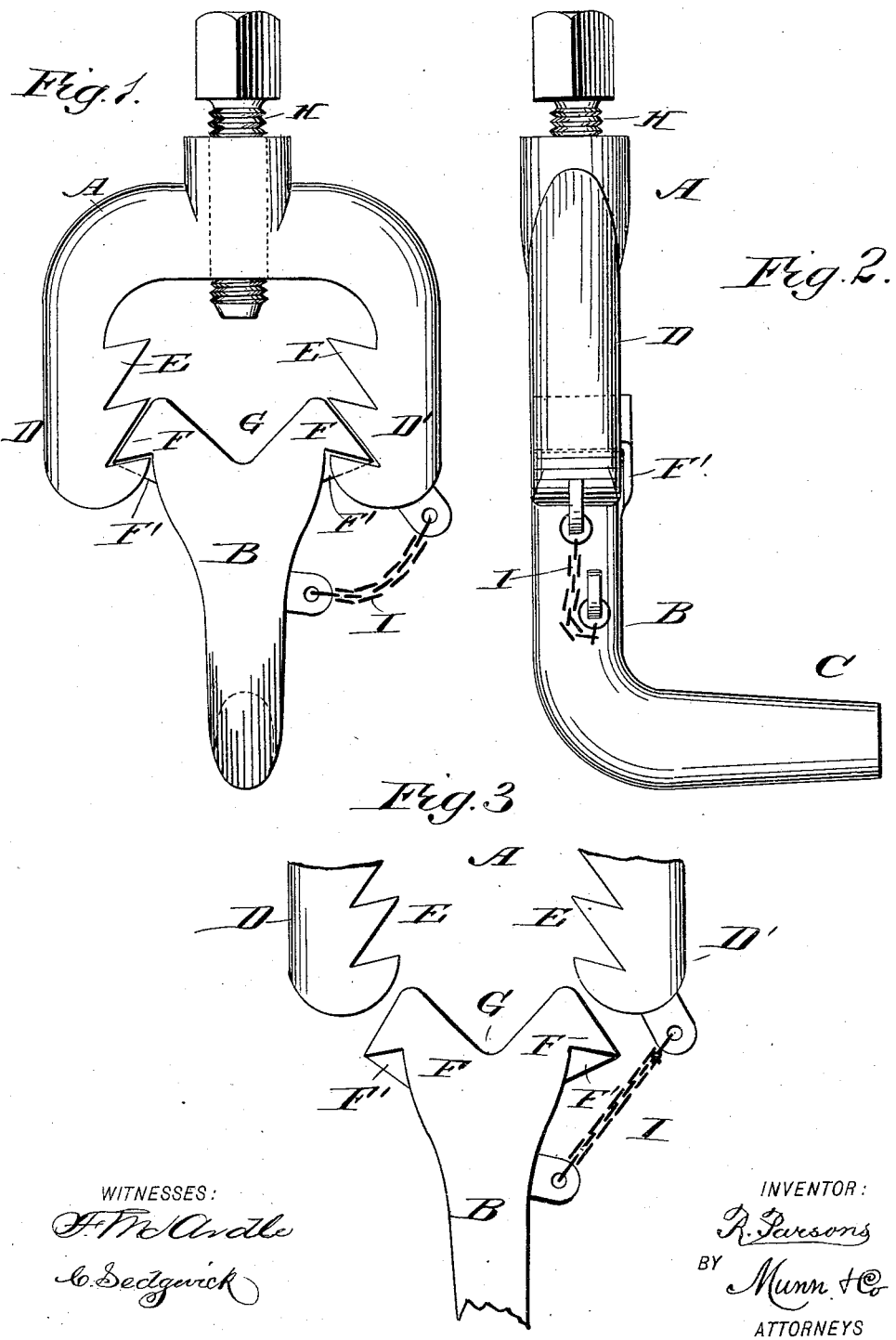

RICHMOND PARSONS, OF PHILADELPHIA, ASSIGNOR, BY DIRECT AND MESNE ASSIGNMENTS, TO JOHN C. PALMER, OF RIDLEY PARK, PENNSYLVANIA.

LATHE-DOG.

SPECIFICATION forming part of Letters Patent No. 484,668, dated October 18, 1892.

Application filed November 18, 1890. Renewed January 16, 1892. Again renewed August 17, 1892. Serial No. 443,299. (No model.)

*To all whom it may concern:*

Be it known that I, RICHMOND PARSONS, of Philadelphia, in the county of Philadelphia and State of Pennsylvania, have invented a new and Improved Lathe-Dog, of which the following is a full, clear, and exact description.

The object of the invention is to provide an improved lathe-dog which is simple and durable in construction, can be readily adjusted to different-sized work, and applied without removing the work from the lathe.

The invention consists in certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a face view of the improvement. Fig. 2 is a side elevation of the same, and Fig. 3 is a face view of the same with the two sections detached.

The improved lathe-dog is made in two parts A and B, of which A is the body part and is made in U shape, and the part B is held adjustably on the part A and provided with the usual arm C, adapted to be engaged by the face-plate of the lathe. The two ends D and D' of the body part A are provided at their inner edges with a series of teeth E, adapted to be engaged by corresponding teeth F, formed on the part B, as is plainly shown in Fig. 1. The teeth on the two arms or ends D and D' are arranged opposite each other, so that the two corresponding opposite teeth are engaged by the two teeth F at a time. In order to prevent the part B from slipping forward out of the engaged teeth E, lugs F' are formed on the back of the part B, so as to engage the teeth E at their rear side. The top of the part B is formed with the usual V-shaped notch G, in which the work rests, and in the middle of the body part A screws the screw H onto the top of the work opposite the V-shaped notch G. The part B is connected by a small chain I with one of the arms of the body part A, so as to keep the two parts together, thus preventing loss of either. The chain I is sufficiently long to permit of easily engaging the teeth F with the teeth E.

The dog is applied as follows: The two parts A and B are separated from each other and then the part A is set on top of the work and the other part B, with the notch G in its uppermost position, is placed against the work from below and slipped with its teeth F into the corresponding set of opposite teeth E of the two arms D and D', care being taken that the arm C has previously been moved in engagement with the face-plate. The operator then screws the screw H down, so as to hold the work securely in the V-shaped notch G of the part B. By screwing up the screw H the teeth F and E are held in firm contact with each other, thus preventing displacement of the parts A and B. For large work the teeth F are engaged with the lowermost set of teeth in the arms D and D' and for smaller work correspondingly-higher teeth E are engaged by the teeth F of the part B.

It will be seen that by making the lathe-dogs in parts or sections it can be readily adjusted to different-sized work and applied without removing the work from the centers of the lathe.

Having thus described my invention, I claim as new and desire to secure by Letters Patent—

1. A lathe-dog comprising the body formed by the yoke-piece and the sides, the said sides having teeth on their inner faces, the bridge-piece having teeth on the opposite sides of its upper end, said bridge-piece being adapted to be passed laterally into and out of the body, and the clamping-screw.

2. A lathe-dog comprising the ⋂-shaped body having transverse teeth on the inner faces of its legs, and the part B, having teeth on the opposite sides of its upper end, said part B being adapted to be passed laterally into and out of the ⋂-shaped body, and a clamping-screw, substantially as set forth.

3. A lathe-dog consisting in the ⋂-shaped body having transverse teeth E, and the part B, having oppositely-projecting teeth F on the outer faces of its upper end, to be passed laterally into the spaces or notches between the teeth E and the lugs F', closing at one side the notches or spaces formed by the teeth F and adapted to engage the teeth E and limit the movement of part B, and a clamping-screw, substantially as shown and described.

RICHMOND PARSONS.

Witnesses:
SAMUEL P. COURTNEY,
HARRY B. HERON.

Correction in Letters Patent No. 484,668.

It is hereby certified that Letters Patent No. 484,668, granted October 18, 1892, upon the application of Richmond Parsons, of Philadelphia, Pennsylvania, for an improvement in "Lathe-Dogs," was erroneously issued to John C. Palmer, of Ridley Park, Pennsylvania, as assignee of said invention; that said Letters Patent should have been issued to Armstead O. Bills, of Philadelphia, Pennsylvania, as owner of the entire interest in said invention, as shown by the assignments of record in this office; and that said Letters Patent should be read with this correction therein that the same may conform to the record of the case in the Patent Office.

Signed, countersigned, and sealed this 8th day of November, A. D. 1892.

[SEAL.]

CYRUS BUSSEY,
*Assistant Secretary of the Interior.*

Countersigned:
    N. L. FROTHINGHAM,
        *Acting Commissioner of Patents.*